United States Patent

Jorgenson

[15] 3,647,155
[45] Mar. 7, 1972

[54] WINDING DEVICE FOR FISHLINE

[72] Inventor: Julian B. Jorgenson, 3538 Rainbow Drive, Minnetonka, Minn. 55343

[22] Filed: July 22, 1969

[21] Appl. No.: 843,715

[52] U.S. Cl. ................................................242/106, 206/1
[51] Int. Cl. ...................................B65h 75/00, B65h 75/38
[58] Field of Search ......................242/100, 104, 106; 206/1

[56] References Cited

UNITED STATES PATENTS 1,081,435  12/1913  Covington ...........................242/106
2,218,256  10/1940  Bechtel ...............................206/1 X
2,903,196  9/1959   Fowler ................................242/104

Primary Examiner—George F. Mautz
Assistant Examiner—Gregory A. Walters
Attorney—Dugger, Peterson, Johnson & Westman

[57] ABSTRACT

A winding device for transferring fishing line from storage spools to a spool for a fishing reel which may use a storage case for the line and winder as a base member for mounting the line spool and the reel spool in proper position so that as winding takes place the line will not twist.

8 Claims, 5 Drawing Figures

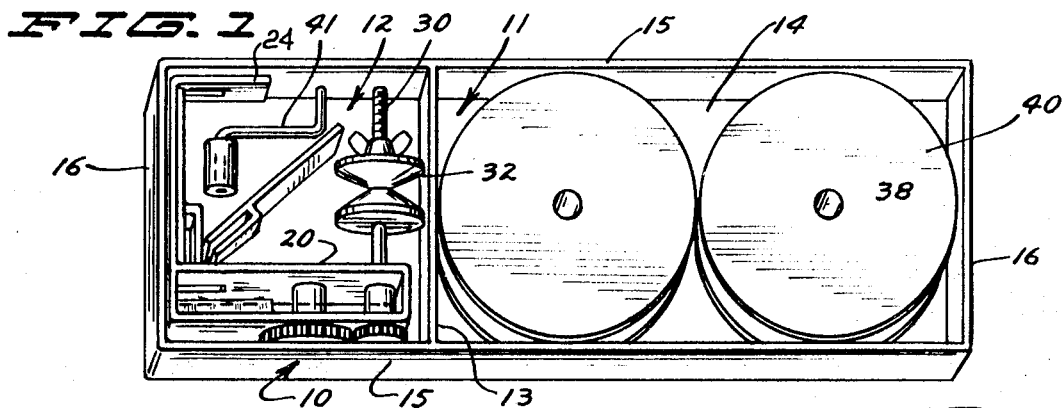
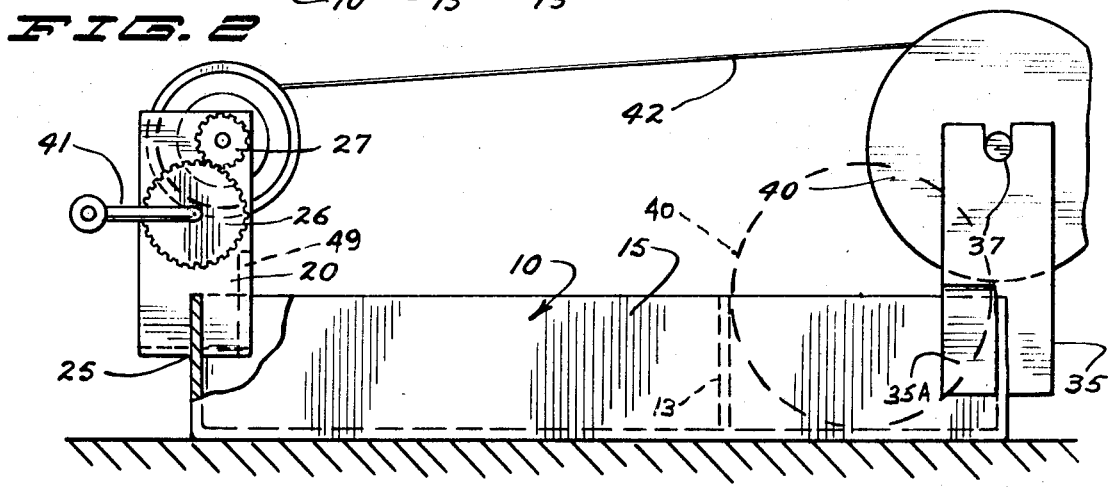
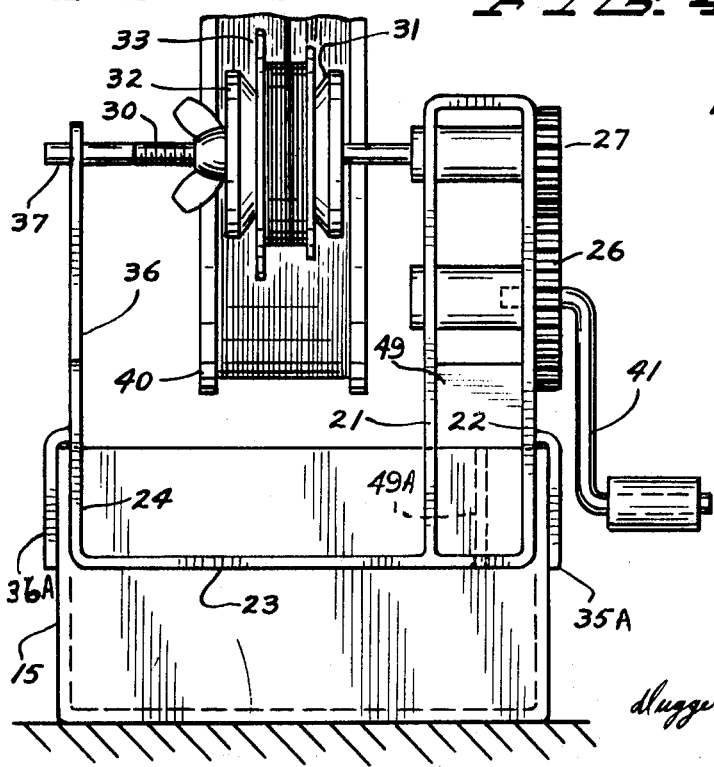
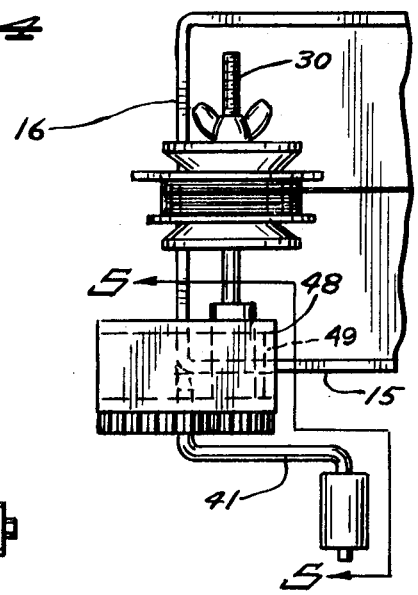
INVENTOR.
JULIAN B. JORGENSON
BY
Dugger, Peterson, Johnson & Westman
ATTORNEYS

WINDING DEVICE FOR FISHLINE

BACKGROUND OF THE INVENTION

1. Field of the Invention

The present invention relates to winding devices, more particularly to a compact winding device which uses as a base member a storage box or tray for the device and extra spool or spools of line that is to be wound.

2. Prior Art

One of the problems facing fishermen is the need for a compact winding device which they can use to transfer new fishing line from a supply spool onto a reel spool without twisting the line in the process. Line twist is a major source of irritation and frustration to fishermen who use spinning or spin-cast reels. While commercial winding machines are available, they are usually quite large, bulky, and expensive. The fisherman does not have a device which will store in a tackle box easily, and can be used for transferring line from a storage spool onto the reel spool.

Further, it is desirable to have extra line along in the boat, and the present device forms a compact package which incorporates a storage box, and uses this for a base for the winding device.

U.S. Pat. No. 3,312,418 shows a fishline applicator for spinning reels which mounts directly onto the reel itself and utilizes a tumbling principle rather than a rolling method of transfer. U.S. Pat. No. 2,459,963 also shows a prior art winding device.

SUMMARY OF THE INVENTION

A fishline-winding device which can be returned to and used with a tackle box includes a package member forming a base and device to house at least one spool of fishline, and the winding device, and wherein the package or box forms a base for the winding device during transfer of the line from the storage spool to a reel spool.

The device forms a high-speed winder which does not twist the line as it transfers it to the reel spool, and the device can be adapted to operate with different size reel spools and different types of spools without any modification. The device is simple to make, and can be sold as a complete package with or without line, and the box itself forms a storage space for both the line and the base for the winding device.

BRIEF DESCRIPTION OF THE DRAWINGS

FIG. 1 is a perspective view of a storage box having a winding device and two spools of fishing line installed there and shown as it would be kept in a tackle box or as it would be packaged for sale;

FIG. 2 is a side elevational view of the winding device of FIG. 1 shown in its assembled form and using the storage box as a base member for the winding device;

FIG. 3 is an end elevational view of the device of FIG. 2 as viewed from the left end thereof;

FIG. 4 is a top plan view of the winding device showing it mounted on a different type of bracket from the device of FIG. 3.

DESCRIPTION OF THE PREFERRED EMBODIMENTS

Figure 5:
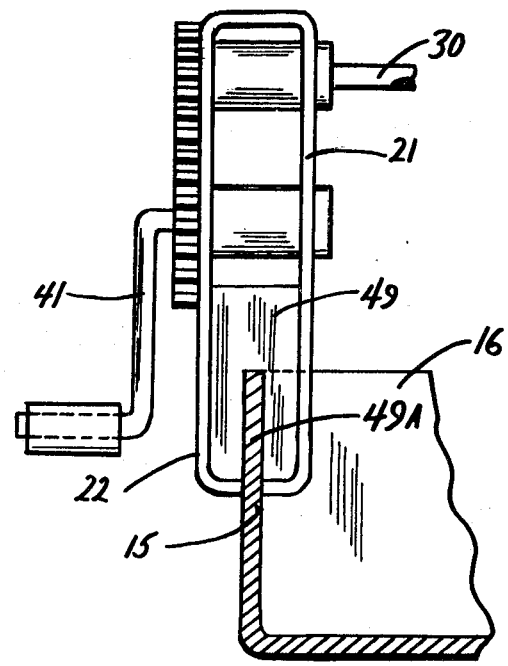
FIG. 5 is a sectional view taken as on line 5—5 in FIG. 4.

A fishline storage box illustrated generally at 10 can be made of any suitable material, such as plastic, and is divided into a first reel or line spool storage compartment 11, and a winding device storage compartment 12 with a divider member 13. The box has a bottom 14, upright sidewalls 15,15, and end walls 16,16. The walls are attached to the bottom of the box forming an enclosure. The box can have any suitable type of cover member for storage, and the cover member is not shown for sake of clarity. Compartment 12 as stated before houses the winding device. This device comprises first a base member 20. The base member has a pair of spaced-apart upright legs 21 and 22 adjacent one side thereof, and a bottom member 23 that extends across the lateral width of the box and has a further spaced upright leg 24. A slot is defined in these legs and the bottom member 23, and in a cross member 49 joining the legs 21 and 22. The cross slot is shown at 25, and is of size so that it will slip over an end wall 16 of the box and if desired adjacent portions of the sidewalls 15. The two legs 21 and 22 which are spaced closely apart adjacent one end rotatably mount a first drive gear 26, and a second smaller gear 27. A spindle 30 is drivably connected to gear 27 so that it will rotate with the gear 27, and extends outwardly over the bottom member 23. The spindle 30 is supported by legs 21 and 22 and is threaded at one end. A pair of centering plugs 31 and 32 are mounted on the spindle. The centering plugs have facing frustoconical inner surfaces, which are made so that they will tend to center a reel spool 33 that has been placed between the plugs. The inner plug 31 can be drivably mounted to the spindle 30 in some manner, for example, just pressed against a shoulder, or threaded on, and the outer plug 32 would be adjustable. In other words, the outer plug 32 should be removable so that the reel spool 33 can be slid onto the inner plug 31, and then a wing nut, as shown, 34 can be tightened down against the outer centering plug to hold the unit together. The reel spools from spinning or spin-cast reels have various sizes of center openings. The centering plugs will partially fit within this opening and support the reel spool along the edges of the opening.

A pair of line spool support brackets 35 and 36 are slipped over the remote end wall 16 of the box and adjacent end portion of sidewalls 15. A pencil or dowel 37 can be slipped through the opening 38 in a line storage spool 40, so that the spool is rotatably mounted on this dowel. The brackets 35 and 36 just have offset shaped lower members 35A and 36A that slip over the sidewalls 15 of the base or box 10 and a provided slot in the upright portion to slip over the wall 16 and are used to rotatably mount spool 40 in position spaced from the winding bracket 20. Note that the offset members 35A and 36A are only about one-half the width of the upright members.

A crank 41 which has a shank that is made so that it will drive (for example, a square cross section) is slipped inside a mating driving opening of the large gear 26, as shown, and upon rotation the gear 26 will drive the gear 27 and rotate the spindle 30 and thus rotate the reel spool 33 mounted between the plugs 31 and 32. The gears 26 and 27 provide for a greater winding speed. When the spools are in place, a line shown at 42 is started onto the reel spool 33 mounted on the spindle and then wound on the reel spool. The winding will remove the line from the storage spool 40. When the reel spool 33 is full, the unit can be disassembled and placed into the storage box and/or placed back in the tackle box or tackle box tray.

Thus the base member for the winding device and brackets is the storage box for the line and the winding device when the device is to be stored.

In FIG. 4, a different type of base bracket is shown. This bracket 48 has upright legs such as 21 and 22, as before, but the bottom member 23 is greatly shortened (it only extends the width of the upright legs 21 and 22), and a T-shaped slot is provided so that the bracket 48 will fit over the corner portion of the box partially on the end wall 16 and partially on the sidewall 15. A wall 49 extends between the legs 21 and 22 and is used to give stability to the bracket. This wall 49 is also present in bracket 20 and is shown in FIGS. 2 and 3. A slot 49A in the wall 49 fits over the sidewall 15 and gives the bracket stability. The rest of the construction is exactly the same as previously described. Thus this is another way of mounting the bracket onto the box. The slot in the bracket 48 can be such that it would also mount only on the end wall 16 of the box if desired. The bracket shown in FIG. 3 can be moved laterally to the right and slot 49A shown in FIG. 3 may be placed over wall 15 of the box if desired.

The winding device, thus, gives a device which will transfer line from storage spool 40 to a reel spool 33 without putting twist in the line, and it is stable. The base which makes it stable may be the storage box for the new line and the winding device.

The supply spool can be rotatably retained in the box loosely. In other words, if the spool 40 is placed on its periphery in compartment 12 on the opposite side of wall 13 from the frame 20, the supply spool will rotate as line is taken off without a dowel for an axis. (See dotted lines in FIG. 2). The wall 13 forms a means to rotatably mount the spool adjacent the opposite end wall from frame 20. If desired, a small battery electric motor can be used for driving the spindle. These small motors can be operated on batteries that also can be stored in the box 10.

The brackets or bases can be mounted onto the walls of a tackle box tray if desired. The mounting slots in the base make this possible. The slots are of size to accommodate most tackle box tray walls or dividers. The brackets mount onto the walls or dividers in the same manner as on the storage box shown. The winding can then proceed in the same way.

A compartment in a tackle box or tackle box tray can be utilized for storing the winding device, if desired.

What is claimed is:

1. A device for storing fishing line supply spools and winding fishing line from a line supply spool to a fishing reel spool, comprising a storage box including spaced-apart upright walls and a bottom member fixedly supporting said walls, and a winder assembly including a spindle member, means to rotatably mount said spindle member including a frame, said frame having a pair of spaced upright walls, and means joining said frame upright walls, slot means defined in the upright walls of said frame to permit removably mounting the frame at least partially over the upper portion of a first of said upright walls of said box, said spindle member including means to mount a spool from a fishing reel thereon for rotation therewith, a supply spool of fishing line, means to retain said supply spool adjacent a second upright wall of said box with the axis of rotation of said supply spool substantially parallel to the spindle axis, and means to rotate said spindle, said box being of size to store at least one supply spool of fishing line and the other parts comprising the winder assembly.

2. The device of claim 1 wherein said means to retain said supply spool adjacent a said second upright wall of said box includes bracket means removably mountable on said box, and an axle member to rotatably receive said supply spool.

3. The device of claim 1 wherein said frame has at least two upright walls at right angles to each other and said first and second upright walls are end walls of said box, and said box has upright sidewalls joining said end walls of said box, and said slot means is formed through at least two walls of said frame at right angles to each other whereby said frame may be positioned partially over one upright end wall and an adjoining upright sidewall of said box.

4. The device of claim 1 wherein said means to rotate said spindle includes a crank member and a gear set on the frame to rotate said spindle at a greater speed than the speed of rotation of said crank member.

5. The device of claim 1 wherein said means to mount a fishing reel spool on the spindle include a pair of centering plugs having facing frustoconical surfaces of size to partially fit within a center opening of a reel spool to be supported.

6. The device of claim 5 and means to adjustably retain said centering plugs on said spindle.

7. A winding device for transferring fishing line from a supply spool to a fishing reel spool comprising a frame member, said frame member including a pair of spaced-apart upright walls and a bottom wall joining said upright walls, a spindle rotatably mounted to said upright walls, means to mount a fishing reel spool on said spindle for rotation with said spindle, drive means to rotate said spindle, and means to mount said frame onto a support wall comprising a slot defined in said upright walls and said bottom wall to fit closely over upper portion of said support wall.

8. The winding device of claim 7 and an end wall extending between the upright walls and positioned along one edge thereof, said slot being defined in said end wall and said upright walls and bottom wall to permit mounting the frame means onto a corner junction of two support walls.

* * * * *